United States Patent
Tsai

(10) Patent No.: US 8,090,149 B2
(45) Date of Patent: Jan. 3, 2012

(54) IMAGE CAPTURING DEVICE AND USAGE METHOD THEREOF

(75) Inventor: Chao-Lien Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 880 days.

(21) Appl. No.: 12/134,223

(22) Filed: Jun. 6, 2008

(65) Prior Publication Data

US 2009/0060282 A1    Mar. 5, 2009

(30) Foreign Application Priority Data

Aug. 31, 2007   (CN) .......................... 2007 1 0201562

(51) Int. Cl.
G06K 9/00 (2006.01)
H04N 9/07 (2006.01)
H04N 9/80 (2006.01)

(52) U.S. Cl. .......................... 382/103; 348/267; 386/242

(58) Field of Classification Search .................. 382/103, 382/107, 236; 348/49, 50, 73, 143, 151, 348/152, 174, 175, 207, 1, 207.2, 207.99, 348/208, 4, 208.99, 374, 207.1, 208.4; 386/210, 386/224, 227, 242; 396/353, 354, 419, 439, 396/544
See application file for complete search history.

(56) References Cited

U.S. PATENT DOCUMENTS

| 5,619,258 | A | * | 4/1997 | Gillespie | 348/97 |
| 7,627,199 | B2 | * | 12/2009 | Sato et al. | 382/305 |
| 2003/0151672 | A1 | | 8/2003 | Robins et al. | |
| 2006/0045514 | A1 | | 3/2006 | Matsushita et al. | |
| 2007/0153090 | A1 | * | 7/2007 | Liow et al. | 348/207.99 |
| 2008/0309770 | A1 | * | 12/2008 | Florea et al. | 348/208.4 |

FOREIGN PATENT DOCUMENTS

| CN | 1141427 | Y | 1/1997 |
| TW | 200643806 | A | 12/2006 |
| TW | I284293 | B | 7/2007 |
| TW | 200731781 | A | 8/2007 |

* cited by examiner

*Primary Examiner* — Abolfazl Tabatabai
(74) *Attorney, Agent, or Firm* — Altis Law Group, Inc.

(57) ABSTRACT

An image capturing device includes an image capturing module, an image processing module coupled to the image capturing module, a comparing module, and an activating module. The image capturing module is capable of capturing images of an object including a pair of sequential pre-images and a final image of the object. The image processing module is capable of determining a movement of the object in the pair of sequential pre-images. The comparing module determines whether the movement of the object is within the range of a pre-determined movement tolerance stored in the comparing module and is capable of outputting a first trigger signal if the movement of the object is within the range of the pre-determined movement tolerance. The activating module receives the first trigger signal and activates the image capturing module to capture the final image of the object according to the first trigger signal.

7 Claims, 4 Drawing Sheets

IMAGE CAPTURING DEVICE AND USAGE METHOD THEREOF

BACKGROUND

1. Field of the Invention

The present invention relates to imaging technology, and particularly, to an image capturing device and a usage method thereof.

2. Description of the Related Art

Image capturing devices, such as digital still cameras and camcorders, are popular with consumers. They often have a delay-timer to allow users to include themselves in the images they capture. However, the delay may not always be long enough to allow users to get positioned properly before the device captures the image.

What is needed, therefore, is to provide an image capturing device, in which the above problem is eliminated or at least alleviated.

SUMMARY

An exemplary image capturing device includes an image capturing module, an image processing module coupled to the image capturing module, a comparing module, and an activating module. The image capturing module is capable of capturing images of an object including a pair of sequential pre-images and a final image of the object. The image processing module is capable of determining a movement of the object in the pair of sequential pre-images. The comparing module determines whether the movement of the object is within the range of a pre-determined movement tolerance stored in the comparing module and is capable of outputting a first trigger signal if the movement of the object is within the range of the pre-determined movement tolerance. The activating module receives the first trigger signal and activates the image capturing module to capture the final image of the object according to the first trigger signal.

Other advantages and novel features of the present invention will become more apparent from the following detailed description of exemplary embodiments when taken in conjunction with the accompanying drawings.

DETAILED DESCRIPTION OF THE EMBODIMENTS

Reference will now be made to the figures to describe exemplary embodiments in detail.

Figure 1:
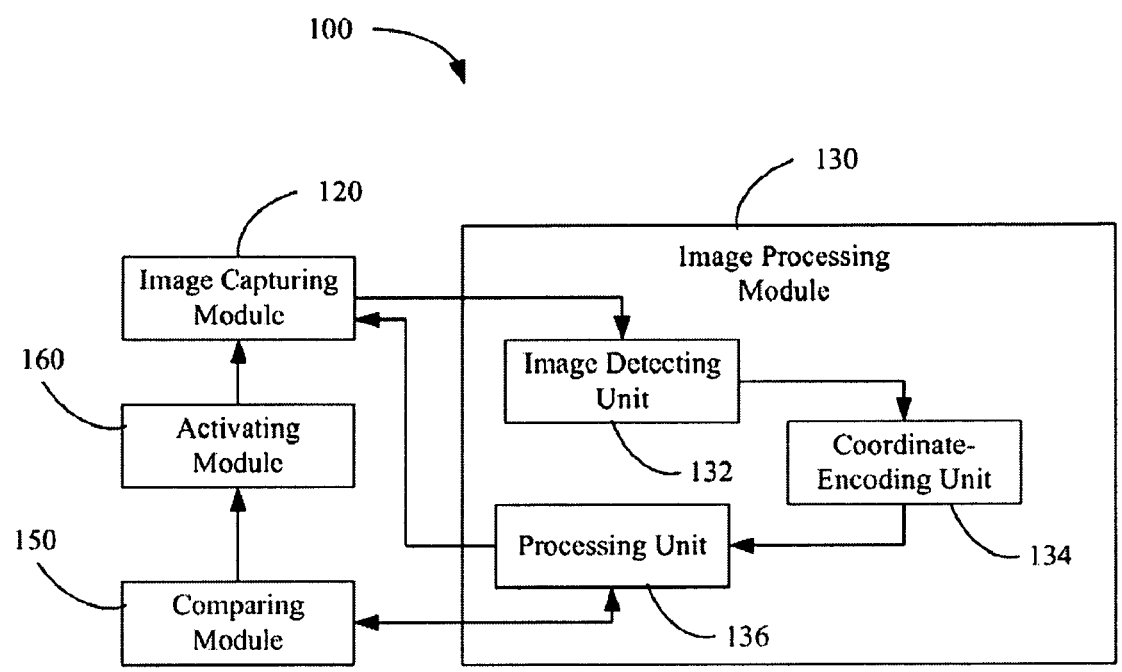
FIG. 1 is a functional diagram of modules of an image capturing device according to an exemplary embodiment.

Referring to FIG. 1, an image capturing device 100 according to an exemplary embodiment is shown. The image capturing device 100 includes an image capturing module 120, an image processing module 130, a comparing module 150, and an activating module 160.

The image capturing module 120 may include an imaging sensor, such as a charge coupled device sensor or a complementary metal-oxide semiconductor sensor. The image capturing module 120 is capable of capturing images of an object including a pair of sequential pre-images and a final image of the object, and transmitting the pair of sequential pre-images to the image processing module 130.

The image processing module 130 is capable of determining a movement of an object (a user trying to take a self-portrait for example) in a pair of sequential pre-images. The image processing module 130 includes a detecting unit 132, a coordinate-encoding unit 134, and a processing unit 136. The detecting unit 132 is capable of detecting positions of the object, e.g., a person's face, in the pair of sequential pre-images respectively. The coordinate-encoding unit 134 is capable of establishing a same coordinate system in the pair of sequential pre-images, and determining coordinates of the object in the coordinate system respectively. The processing unit 136 is capable of computing the movement of the object in the pair pre-images according to the coordinates of the object in the pair of sequential pre-images.

The comparing module 150 is capable of determining whether the movement of the object is within the range of a pre-determined movement tolerance stored in the comparing module 150. If the movement is within the range of the pre-determined movement tolerance, the comparing module 150 outputs a first trigger signal to the activating module 160. The activating module 160 is capable of activating the imaging capturing module 120 to capture the final image of the object according to the first trigger signal. If the movement is outside the range of the pre-determined movement tolerance, the comparing module 150 outputs a second trigger signal to the processing unit 136 of the image processing module 130. The processing unit 136 of the image processing module 130 receives the second trigger signal and controls the image capturing module 120 to capture another pair of sequential pre-images according to the second trigger signal.

Figure 2:
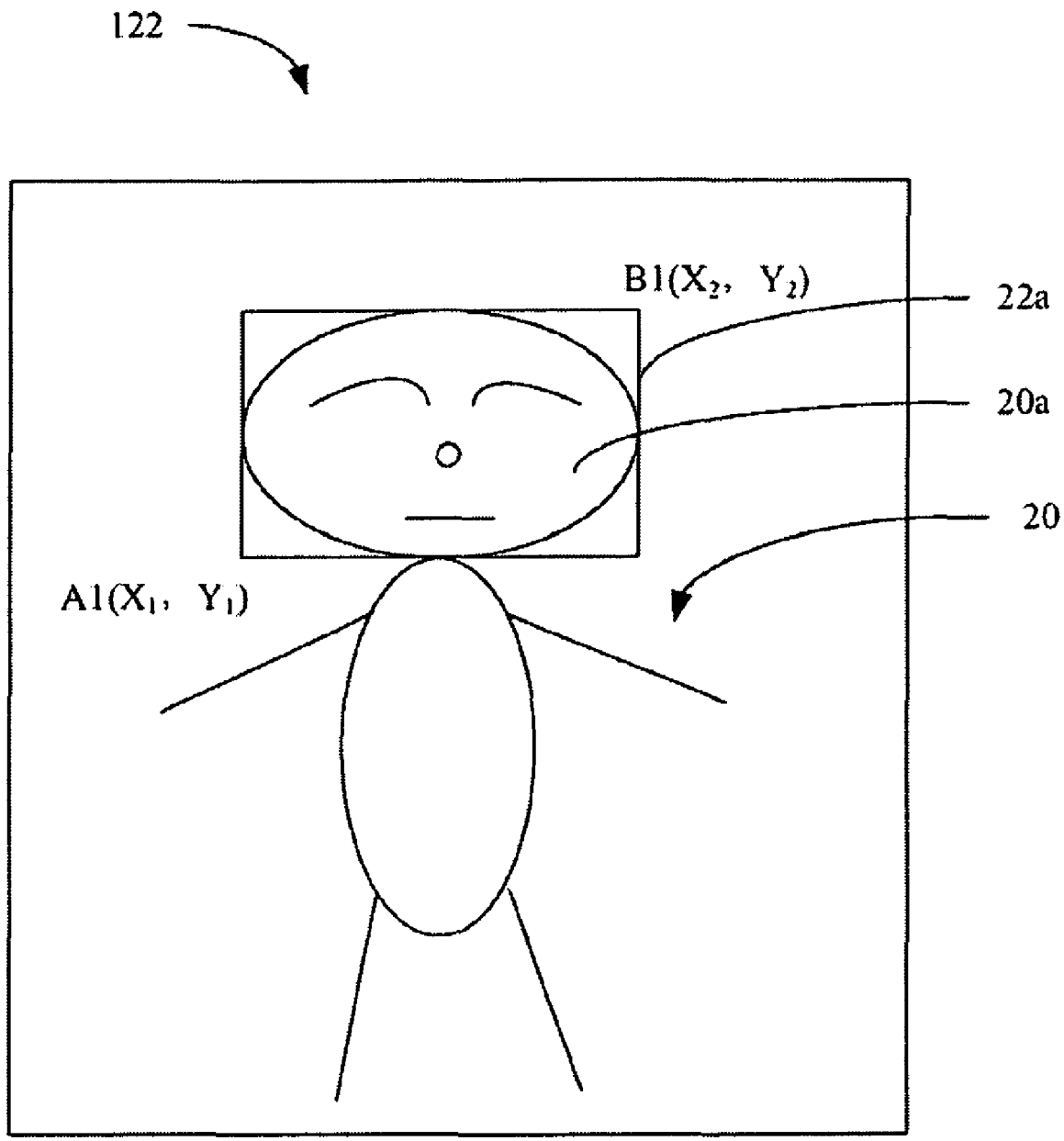
FIG. 2 shows a first pre-image of a pair of sequential pre-images captured by the image capturing device of FIG. 1.
Figure 3:
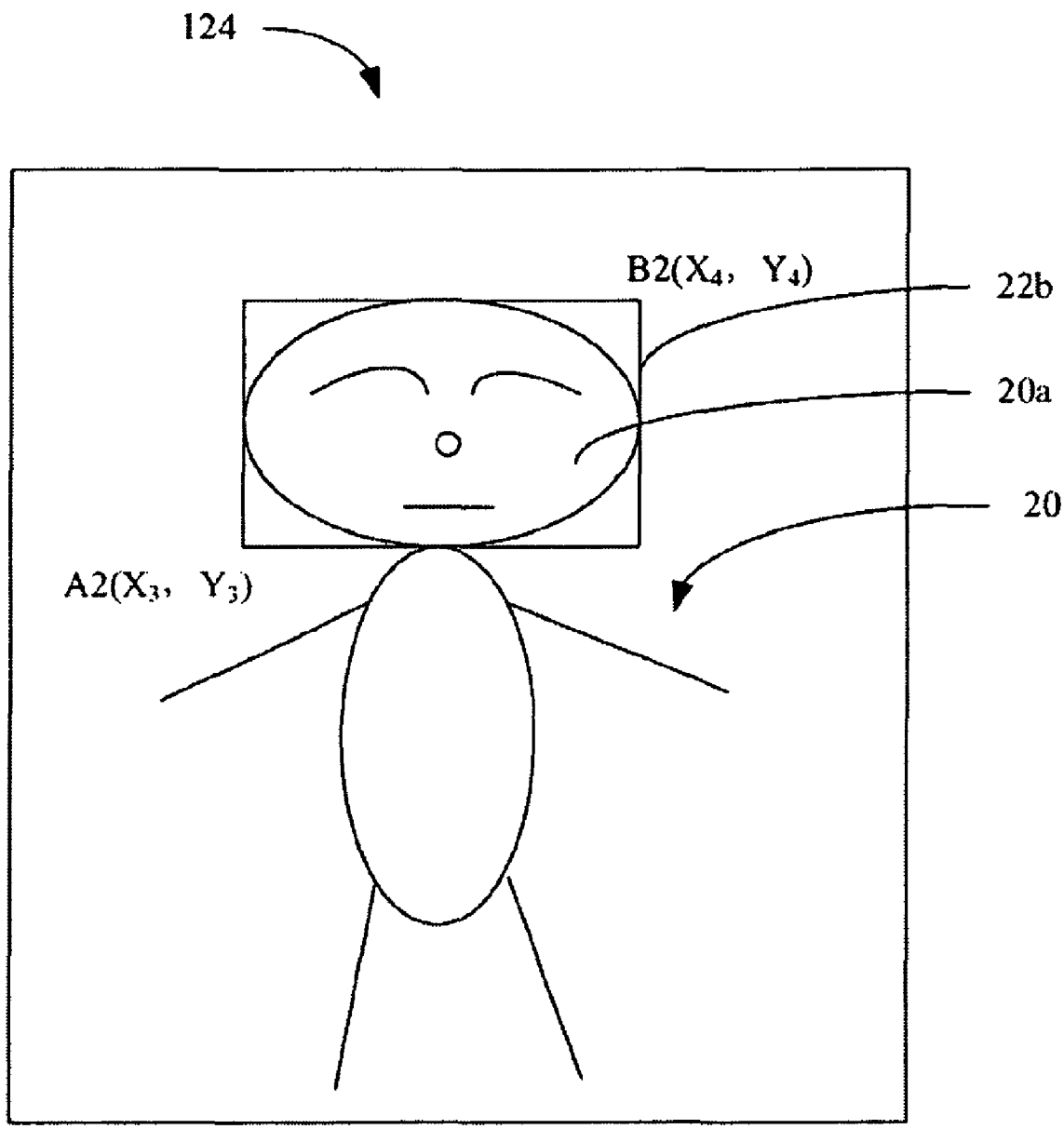
FIG. 3 shows a second pre-image of the pair of sequential pre-images captured by the image capturing device of FIG. 1.

To capture a self-portrait, a user presses a function key (not shown) on the image capturing device 100 to turn on a delay-timer function of the image capturing device 100. Referring to FIGS. 2 and 3, the image capturing module 120 captures a pair of sequential pre-images 122, 124 (hereinafter referred to as a first pre-image 122, and a second pre-image 124 respectively) of the viewing area in which the user 20 intends to pose. The detecting unit 132 detects the user's face 20a in the first pre-image 122 and second pre-image 124, respectively. The coordinate-encoding unit 134 establishes a coordinate system in the pre-images 122 and 124 respectively, and determines coordinates of the face 20a in the pre-images 122 and 124. In detail, the detecting unit 132 further defines a minimum circumscribed rectangle 22a of the self-portrait 20a in the first pre-image 122 based on the user's face 20a detection, as shown in FIG. 2. The coordinate-encoding unit 134 determines coordinates of two diagonal vertices A1, B1 of the rectangle 22a. For example, the coordinate of the vertex A1 is A1 $(X_1, Y_1)$, and the coordinate of the vertex B1 is B1$(X_2, Y_2)$. The same way is used to get respective coordinates of two diagonal vertices A2, B2 of the rectangle 22b in the second pre-image 124, which herein are A2$(X_3, Y_3)$, and B2$(X_4, Y_4)$.

The processing unit 136 computes any movement D of the face 20a between the first pre-image 122 and the second pre-image 124. According to the respective coordinates of the vertices A1, B1, A2, and B2, the movement D is represented as D $(|X_3-X_1|, |Y_3-Y_1|, |X_4-X_2|, |Y_4-Y_2|)$.

The comparing module 150 determines whether the movement D of the face 20a is within the range of a pre-determined movement tolerance stored in the comparing module 150. If the movement D of the face 20a is within the range of the pre-determined movement tolerance, the comparing module 150 outputs a first trigger signal to the activating module 160. The activating module 160 activates the image capturing module 120 so that a final image of the user is taken according to the first trigger signal. If the movement D is outside the range of the pre-determined movement tolerance, the comparing module 150 outputs a second trigger signal to the processing unit 136 of the image processing unit 130. The processing unit 136 of the image processing module 130 receives the second trigger signal and controls the image capturing module 120 to capture another pair of sequential pre-images 120 and repeats the above process.

In other words, during the process of the user positioning himself/herself in front of the image capturing device 100, there will be detectable movement, which will be interpreted to mean that the user is not ready, and no final image should be captured yet. Once the user has settled into his/her desired pose they will hold still, thus no or minimal movement is detected, which is interpreted to mean the user is ready and a final image should be captured.

Figure 4:
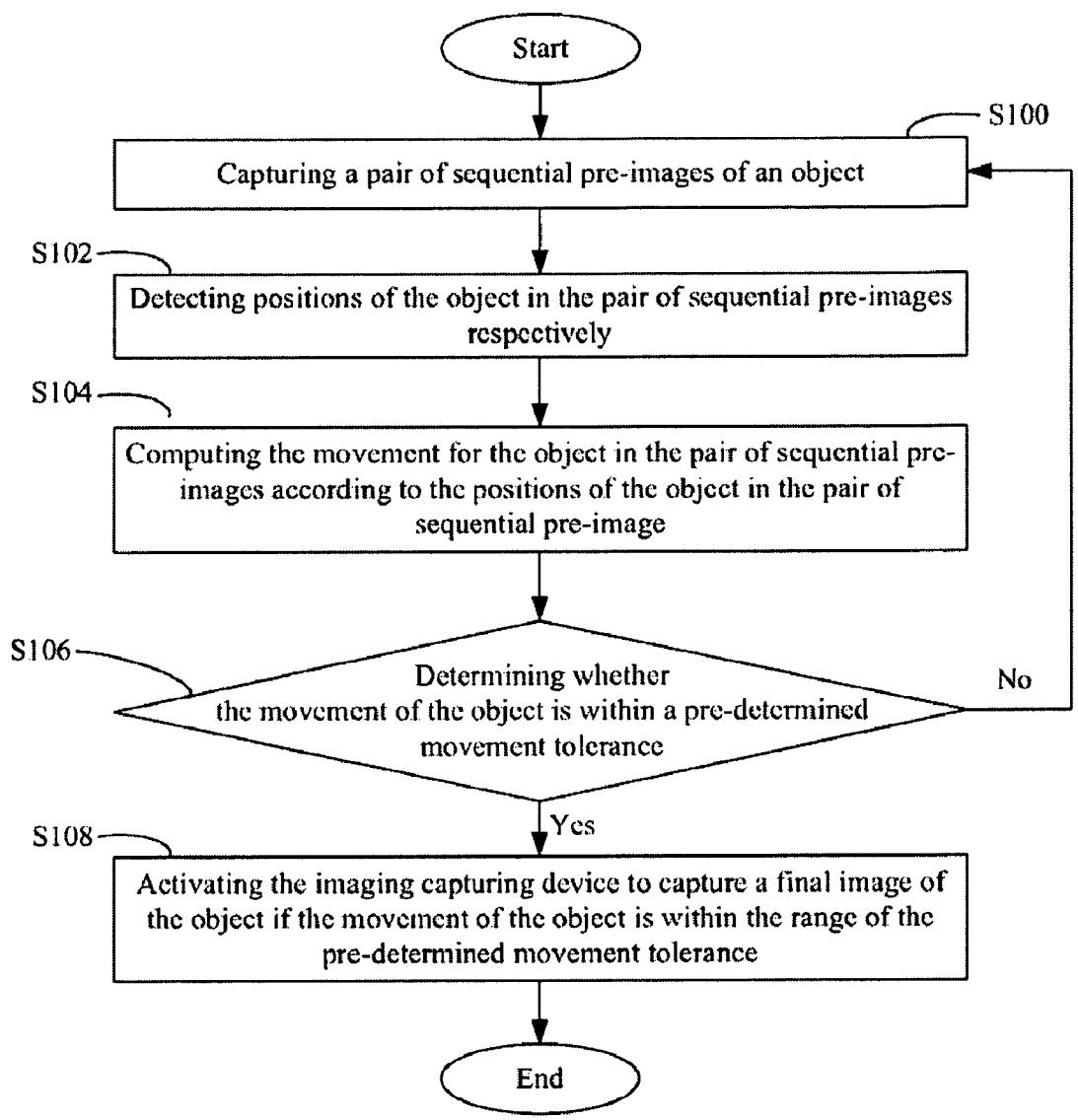
FIG. 4 is a flowchart of a usage method of the image capturing device of FIG. 1.

Referring to FIG. 4, a usage method of the image capturing device 100 includes the steps of capturing a pair of sequential pre-images of an object (S100), detecting positions of the object in the pair of sequential pre-images respectively (S102), computing the movement for the object in the pair of sequential pre-images according to the positions of object in the pair of sequential pre-image (S104), determining whether the movement of the object is within a pre-determined movement tolerance (S106), activating the imaging capturing device to capture a final image of the object if the movement of the object is within the range of the pre-determined movement tolerance (S108), and executing the step S100 if the movement is outside the rang of the pre-determined movement tolerance, and going through the steps S102 to S108.

It is to be understood that the above process is performed during the operation of the delay timer. If the pre-determined time runs out, the image capturing device 100 may be pre-configured to automatically proceed to the step of capturing the final image or may be pre-configured to cancel the delay-timing process.

It is to be understood, however, that even though numerous characteristics and advantages of the present invention have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. An image capturing device comprising:
    an image capturing module capable of capturing images of an object including a pair of sequential pre-images and a final image of the object;
    an image processing module, coupled to the image capturing module, capable of determining a movement of the object in the pair of sequential pre-images;
    a comparing module for determining whether the movement of the object is within the range of a pre-determined movement tolerance stored in the comparing module, the comparing module being capable of outputting a first trigger signal if the movement of the object is within the range of the pre-determined movement tolerance; and
    an activating module for receiving the first trigger signal and activating the image capturing module to capture the final image of the object according to the first trigger signal.

2. The image capturing device as claimed in claim 1, wherein the image processing module includes:
    a detecting unit capable of detecting and defining the object in the pair of sequential pre-images respectively;
    a coordinate-encoding unit capable of establishing a coordinate system in the pair of sequential pre-images respectively, and determining coordinates of the object in the pair of sequential pre-images in the coordinate system respectively; and
    a processing unit capable of computing the movement of the object in the pair of sequential pre-images according to the coordinates of the object in the pair of sequential pre-images.

3. The image capturing device as claimed in claim 2, wherein the object is a user's face.

4. The image capturing device as claimed in claim 3, wherein the coordinate-encoding unit is further capable of determining coordinates of two diagonal vertices of a minimum circumscribed rectangle of the face defined by the detecting unit in the pair of sequential pre-images; and wherein the processing unit is further capable of computing the movement of the face according to the coordinates of the two diagonal vertices in the pair of sequential pre-images.

5. The image capturing device as claimed in claim 1, wherein the comparing module is capable of outputting a second trigger signal if the movement of the object is outside the range of the pre-determined movement tolerance, and the image processing module is capable of receiving the second trigger signal and controlling the image capturing module to capture another pair of sequential pre-images according to the second trigger signal.

6. A usage method of an image capturing device, comprising:
    capturing a pair of sequential pre-images of an object;
    detecting positions of the object in the pair of sequential pre-images respectively;
    computing a movement of the object in the pair of sequential pre-image according to the positions of object in the pair of sequential pre-image;
    determining the movement of the object with a pre-determined movement tolerance; and
    activating the imaging capturing device to capture a final image of the object if the movement of the object is within the range of the pre-determined movement tolerance.

7. The method as claimed in claim 6, further comprising:
    capturing another pair of sequential pre-images of the object if the movement is outside the rang of the pre-determined movement tolerance.